United States Patent [19]

Okada

[11] Patent Number: 5,029,520

[45] Date of Patent: Jul. 9, 1991

[54] AUTOMATIC FOOD FRYING AND VENDING SYSTEM

[75] Inventor: Katsumi Okada, Tokyo, Japan

[73] Assignee: Kabushiki Kaisha Daikure, Tokyo, Japan

[21] Appl. No.: 410,354

[22] Filed: Sep. 21, 1989

[30] Foreign Application Priority Data

Jul. 6, 1989 [JP] Japan .................................. 1-174905

[51] Int. Cl.⁵ .............................................. A47J 37/12
[52] U.S. Cl. .................................. 99/357; 99/403; 99/407; 221/150 R; 221/150 HC
[58] Field of Search ...................... 99/289 R, 357, 403, 99/407, 409, 411; 221/31, 121, 150 R, 150 HC, 150 A

[56] References Cited

U.S. PATENT DOCUMENTS

| 3,237,804 | 3/1966 | Bardy et al. | 221/150 HC |
| 3,398,672 | 8/1968 | Hoeberigs | 221/150 HC |
| 3,685,432 | 8/1972 | Hoeberigs | 221/150 HC |
| 3,928,045 | 12/1975 | Tsunoda et al. | 99/357 |
| 4,505,193 | 3/1985 | Mariotti | 99/407 |
| 4,748,902 | 6/1988 | Maurantonio | 99/407 |

FOREIGN PATENT DOCUMENTS

| 1359015 | 3/1964 | France | 99/357 |
| 2491031 | 4/1982 | France | 99/407 |
| 2589607 | 5/1987 | France | 221/150 HC |

Primary Examiner—Harvey C. Hornsby
Assistant Examiner—Mark Spisich
Attorney, Agent, or Firm—Finnegan, Henderson, Farabow, Garrett & Dunner

[57] ABSTRACT

An automatic food frying and vending system which is so constructed that a storage chamber for storing therein the food material to be fried in their frozen state and a frying chamber for frying the material in cooking oil are installed in the main body of the automatic food frying and vending system in discrete sections designated for their respective purposes; then a stocker for receiving and keeping a larger number of packed containers, each having lid or cover, of the abovementioned food material to be fried is provided in the abovementioned storage chamber; a carrying device for taking out, one by one, from the storage chamber each container of the food material to be fried which has so far been housed in the stocker, and a transporting and feeding device for receiving thereon the container of the food material to be fried, as taken out of the storage chamber by the carrying device, opening the sealed cover of the container, and forwarding the food material to be fried into the frying chamber.

9 Claims, 11 Drawing Sheets

AUTOMATIC FOOD FRYING AND VENDING SYSTEM

BACKGROUND OF THE INVENTION

This invention relates to an automatic vending machine, and, more particularly, it is concerned with an automatic food frying and vending system which is capable of automatically preparing fried food such as fried chicken, chicken nuggets, fried potatoes, and so on, and selling these fried foods through this system to the public in general.

There has been known in this type of vending system that food material is automatically fried in cooking oil and sold from the same system (Japanese Laid-Open Patent Application No. 61-20520).

The abovementioned conventional system, however, possesses various inconveniences such that a customer should take out a packed container of food material to be fried, which is stored in a refrigerating apparatus installed separately from a fried food vending machine, open the lid or cover of the packed container, and put the contents into the frying machine, hence the operating procedures are somewhat troublesome and inconvenient. In addition, it happens not infrequently that the customer puts the food material to be fried into the frying machine without opening the container lid, which is liable to cause various problems such as machine disorders, and others.

The present invention has been made with a view to solving these various problems, and aims at providing an improved food frying and vending system which is capable of storing the materials to be fried in their frozen state, and of automatically frying the frozen food material in cooking oil to be ready for serving to the public in general.

SUMMARY OF THE INVENTION

With a view to attaining the abovementioned objects, the automatic food frying and vending system according to the present invention is constructed as follows.

That is to say, a storage chamber which holds the food material to be fried in its frozen state and a frying chamber for frying the material in cooking oil are installed in the main body of the automatic food frying and vending system in discrete sections designated for their respective purposes. There is further provided a stocker for receiving and keeping a large number of packed containers, each having a lid or cover, of the abovementioned food material to be fried is provided in the abovementioned storage chamber; carrying means for taking out, one by one, from the storage chamber each container of the food material to be fried which was housed in the stocker, and transporting and feeding means for receiving thereon the container of food material to be fried, as taken out of the storage chamber by the carrying means, opening the sealed cover of the container, and forwarding the food material to be fried into the frying chamber.

The foregoing objects, other objects as well as the specific construction and functions of the food frying and vending system according to the present invention will become more apparent and understandable from the following detailed description thereof, when read in conjunction with the accompanying drawings illustrating a preferred embodiment of the automatic frying and vending system.

DETAILED DESCRIPTION OF THE PREFERRED EMBODIMENTS

The material to be fried is frozen and stored in a storage chamber of the construction as mentioned above in a container with lid. The material to be fried, which is stored in the freezing storage chamber, is taken out of it by the carrying means, then the lid of the container is cut-open by the transporting and feeding means, and the material to be fried is automatically sent into the frying chamber and cooked in oil.

Figure 1:
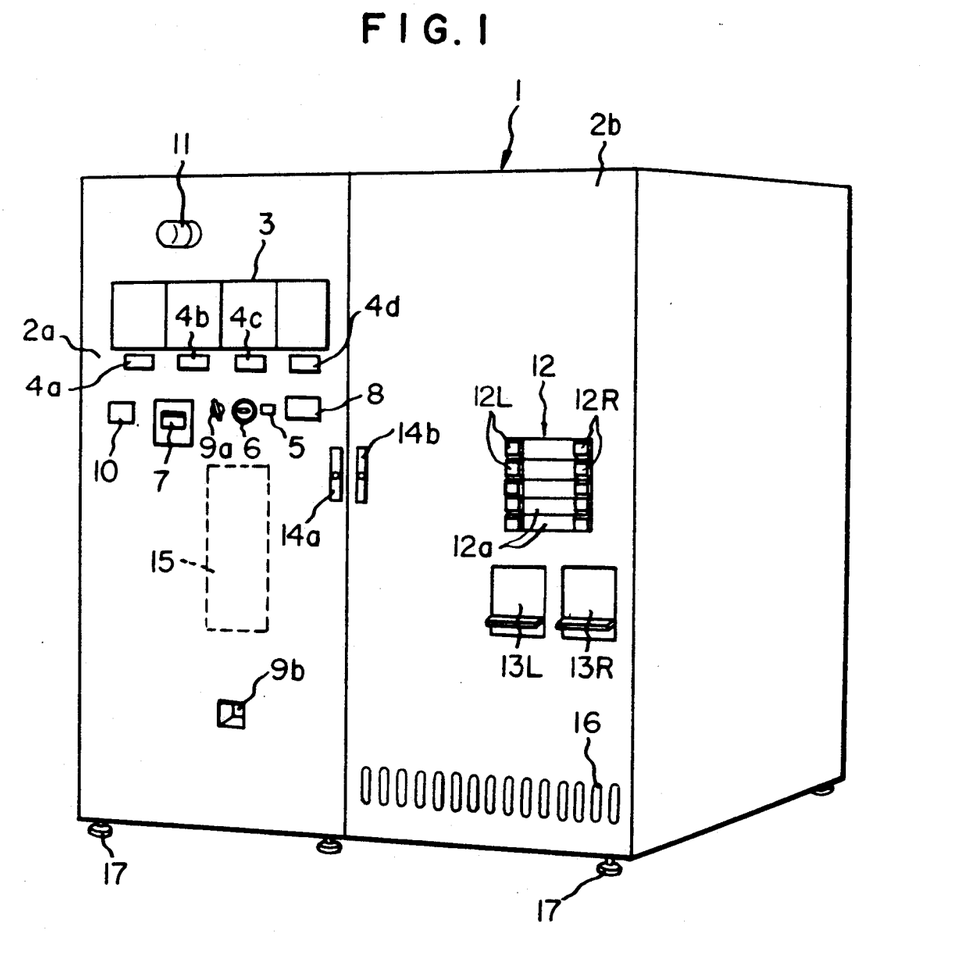
FIG. 1 is a perspective view showing and outer appearance of the automatic food frying and vending system according to one embodiment of the present invention.

In the following description, the present invention will be described in specific details with reference to one preferred embodiment of the automatic food frying and vending system, the outer appearance of which is as shown in FIG. 1.

In the drawing, a reference numeral 1 designates a main body of the system in the form of a console; numerals 2a, 2b respectively refer to doors provided on the front part of the main body 1 of the system. On the front face of one of these two doors (in the illustrated embodiment, the door 2a), there are provided various operating controls for the system such as display panels 3, selection buttons 4a to 4d for the items to be fried, an indicator lamp 5 showing the state of sale of items, a coin slot 6, a bank note slot 7, a monetary amount indicator 8, a money return lever 9a, a returned money receiving port 9b, an indicator 10 showing the food storing temperature, cooking oil temperature or error code, a warning lamp 11, and so forth. Further, on the front face of the other door 2b, there is provided a process indicator 12 having process step indicating lamps 12L, 12R at both sides of each process step indicating slip 12a. At the bottom end of the process indicator 12, there are provided fried food take-out ports 13L, 13R in correspondence to the process step indicating lamps 12L, 12R. Reference numerals 14a, 14b designate respectively locking members for the doors 2a, 2b. A coin counting mechanism 15 is installed inside the door 2a. A numeral 16 refers to external air introducing ports, and a reference numeral 17 denotes support legs for installation of the system main body 1.

Figure 2:
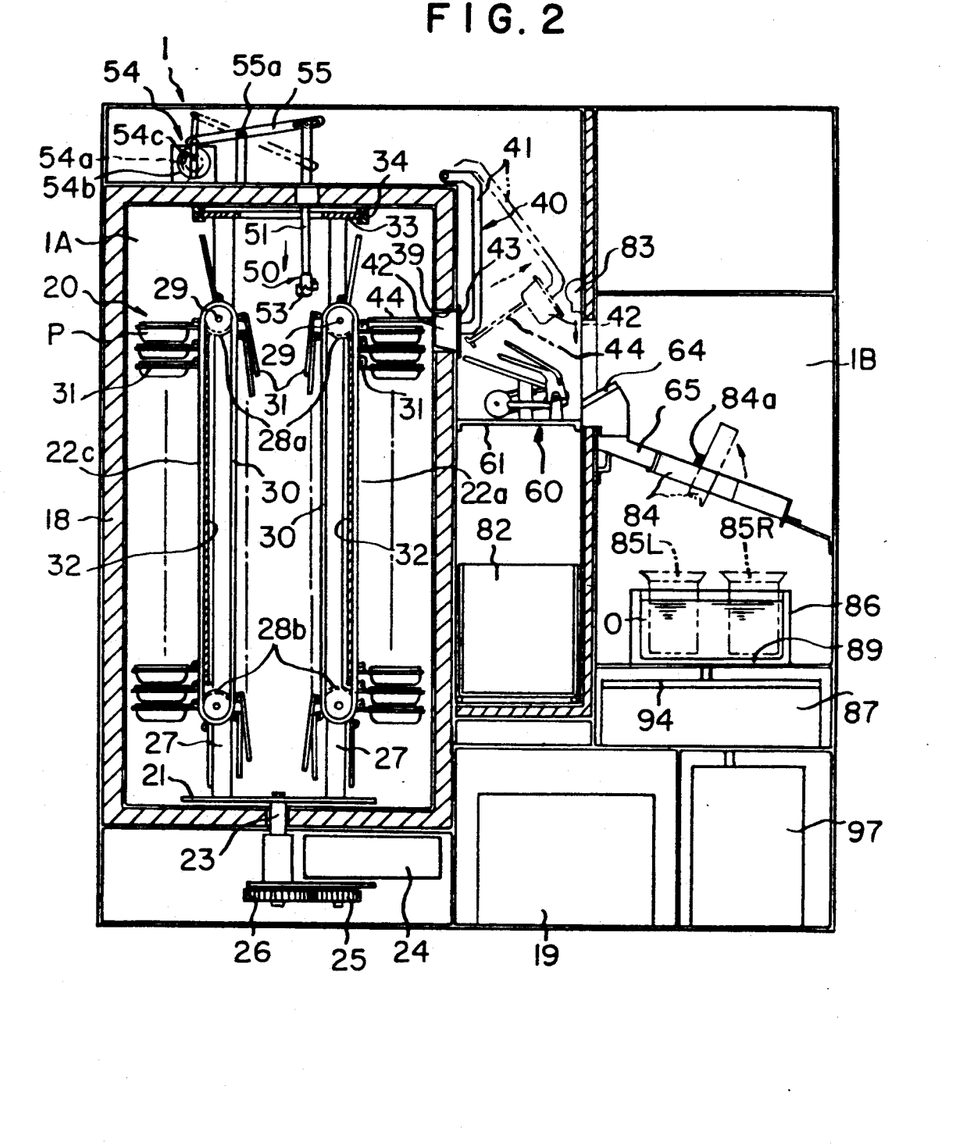
FIGS. 2, 3 and 4 are respectively a front view, a side elevational view and a plan view showing the internal arrangement of the food frying and vending system shown in FIG. 1.
Figure 3:
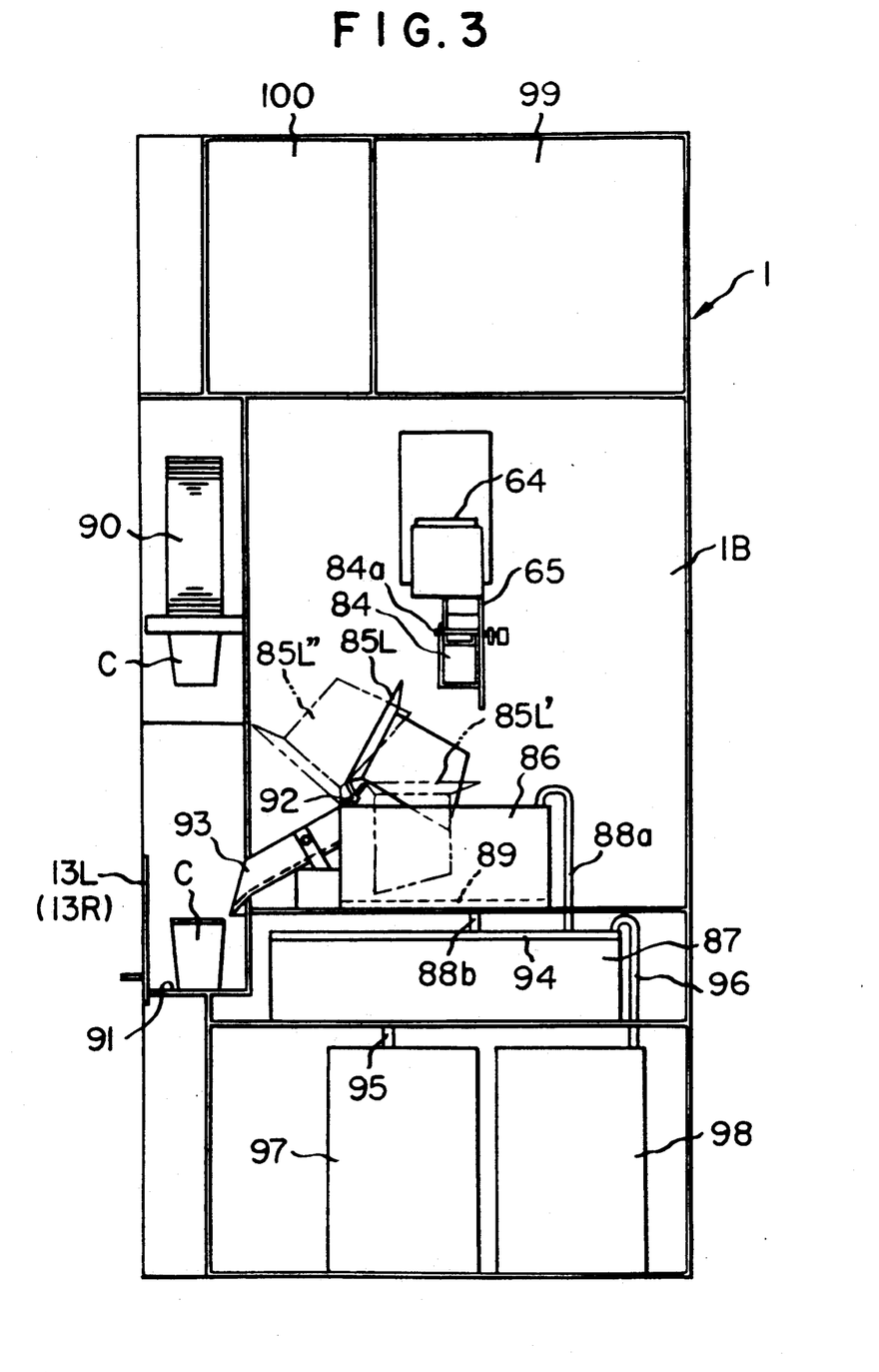
Figure 4:
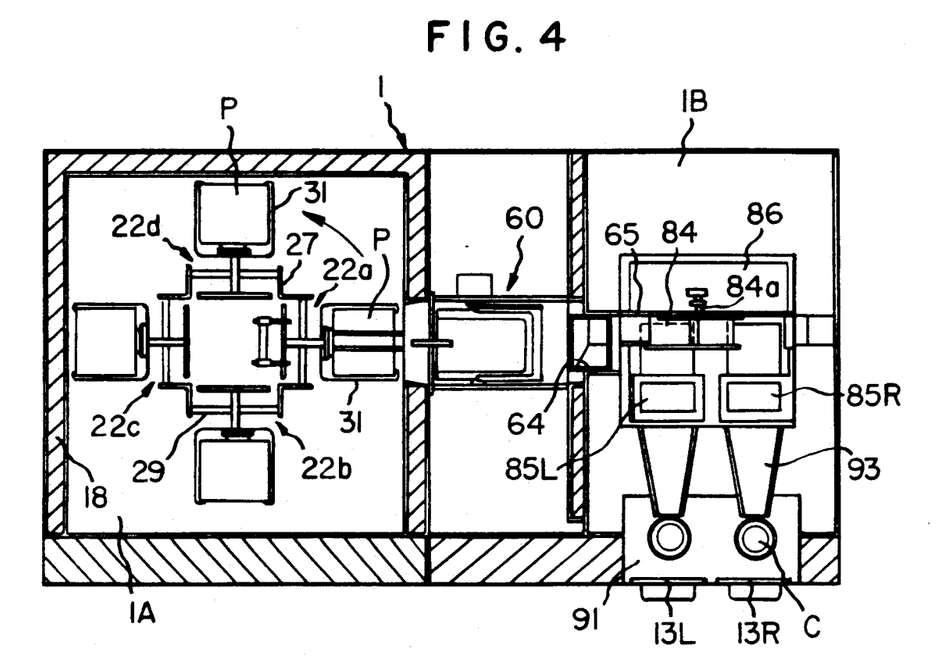

Referring now to FIGS. 2, 3 and 4 respectively illustrating the front view, the side elevational view and the plan view of the internal arrangement of the food frying and vending system according to the present invention, the interior of the main body 1 of the system is divided by a partition wall or the like into discrete sections constituting, on the one hand, a storage chamber 1A for preserving the food materials to be fried in their fronzen condition and, on the other hand, a frying chamber 1B for frying the materials in cooking oil.

The inner surface of the storage chamber 1A is completely lined with a heat-insulating material 18. At the right hand beside the bottom part of this storage chamber 1A, as viewed in FIG. 2, there is installed a refrigeration unit 19 for constantly maintaining the interior of the storage chamber 1A at a predetermined temperature (e.g., −20° C. or so).

Further, in this storage chamber 1A, there is installed a number of stocker units 20 arranged in series, each of which receives and stores therein a plastic container P with lid containing therein the material to be fried.

Figure 5:
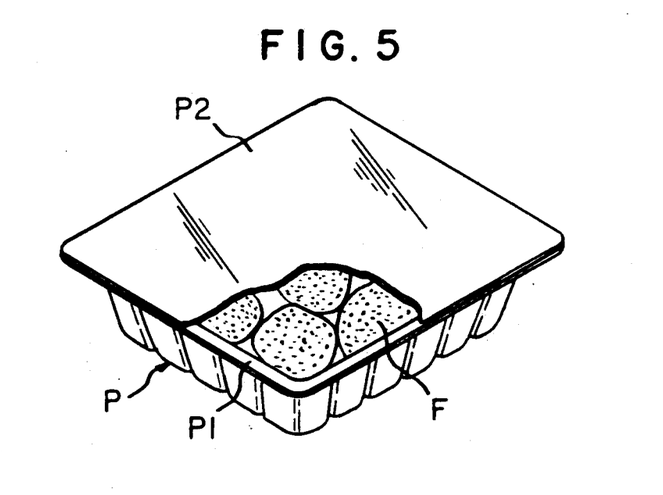
FIG. 5 is a perspective view, partly cut away, of a container with lid for food material to be fried.

In the illustrated embodiment as shown in FIG. 5, the container P is of such a construction that it has a substantially square recess, in plan, having a circumferential flange P1, in which recess the material to be fried F is placed, the top opening of the container being hermetically sealed with a lid P2 made of a sheet of plastic material.

A plurality of stocker 20 are fixed onto a chain conveyor running in the vertical direction, and a plurality of such chain conveyors are installed on and around a turn table 21. In the illustrated embodiment of FIG. 4, four vertical chain conveyors 22a, 22b, 22c and 22d are installed in a circumferential direction about a central point. The turn table 21, as shown in FIG. 2, is held in a freely rotatable manner at the bottom part of the storage chamber 1A, and is rotationally driven at a low speed by a motor 24 provided beneath the storage chamber 1A through gears 25 and 26.

Each of the abovementioned chain conveyors 22a to 22d has a pair of sprockets 28a and 28b which are rotatably mounted on respective horizontal and transverse axes 29 which are mounted on pole braces 27 which are mounted on the turn table 21, each of the pole braces having an L-shaped cross-section. An endless chain 30 made of a plastic material is extended between these sprockets 28a and 28b, on which a number of racks 31 for holding containers of the materials to be fried are hinge-connected. A reference numeral 32 designates a chain guide having an angled U-shape in its cross-section. A numeral 33 refers to an annular disc provided on the top end part of the abovementioned pole braces 27 which is rotatably held by a supporting member 34 provided on the ceiling of the storage chamber 1A.

Figure 6:
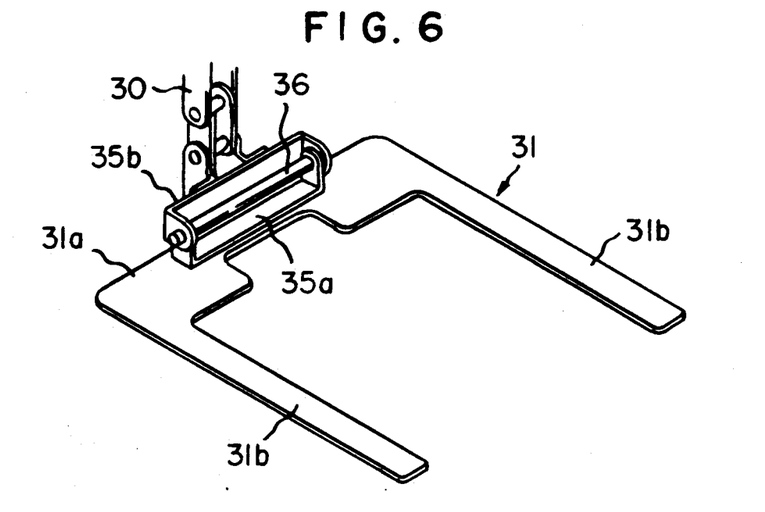
FIG. 6 is a perspective view of a rack for receiving the food container shown in FIG. 5.
Figure 7:
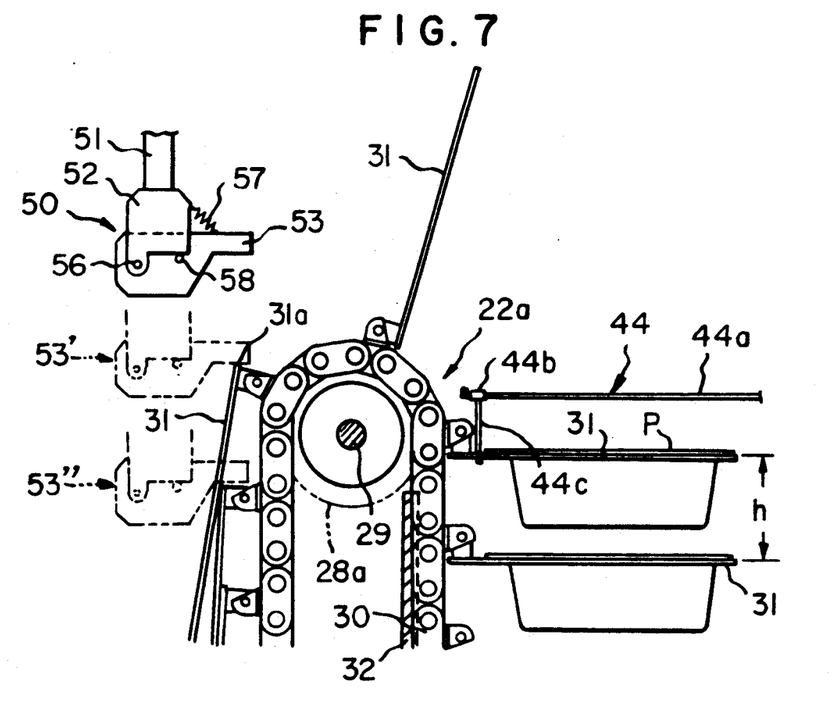
FIG. 7 is an enlarged front view of the upper part of the storage chamber in the food frying and vending system according to the present invention.
Figure 8:
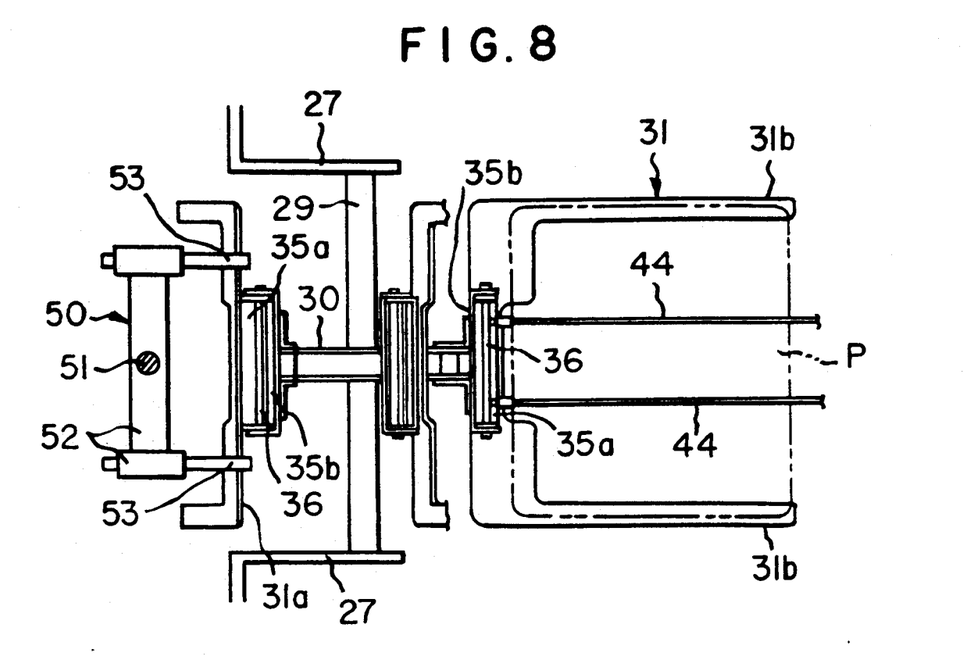
FIG. 8 is a plan view of one part of the upper part of the storage chamber shown in FIG. 7.

Each of the abovementioned racks 31 is formed in a flat plate having a substantially angled U-shape in plan, as shown in FIG. 6, the core part 31a of which is fixed to the chain 30 in a manner to be able to pivot in the up-and-down direction around horizontal axis 36 for oscillation, which is held by supporting members 35a, 35b. Each rack 31, when it is situated at the outside of chain 30 as shown in FIGS. 2 and 7, is held substantially horizontally as in the drawing by the edge 31a of the core part of the rack 31 in the angled U-shape which abuts against the outside surface of the chain 30, and, when it has moved to the inside of the chain 30, it hangs downward. And, as shown in FIGS. 6 and 8, the flanged part P1 of the container P of the material to be fried is placed on the upper surface of mutually opposed arms 31b of the rack 31 extending from both ends of its core part 31a and being held substantially horizontally, as mentioned above.

Figure 9:
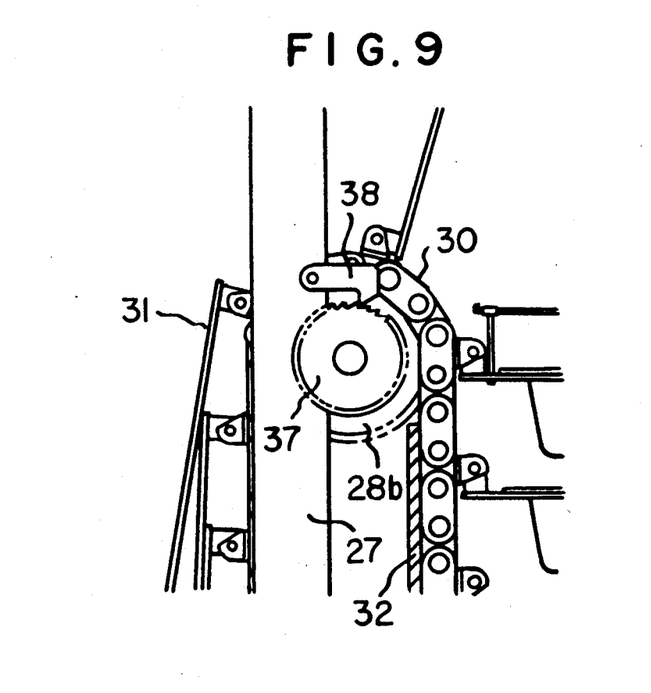
FIG. 9 is an enlarged front view, partly cut away, of the upper part of a chain conveyor used in the storage chamber.

Each of the abovementioned chain conveyors 22a to 22d is provided with a reverse rotation preventive mechanism which functions to prevent the rack 31, on which the container P is mounted, from moving downward under its own dead weight and to also permit it to move upward. The construction of this reverse rotation preventive mechanism is as shown in the embodiment of FIG. 9, wherein an engaging pawl 38 is engaged by its own weight, with a ratchet wheel 37 which is provided coaxially with the upper sprocket 28a of each chain conveyor.

Furthermore, in the illustrated embodiment according to the present invention, each and every chain conveyor holds the containers of different kinds of materials to be fried such as chicken, nuggets, potatoes, and so on, and, when a customer chooses what he or she wants to have, the turn table 21 is automatically rotated by the motor 24, until the chain conveyor which holds the material to be fried of the customer's choice (for example, the chain conveyor 22a) reaches a position facing to the side of the frying chamber 1B as shown in FIGS. 2 and 3, where it is stopped automatically by means of a detecting means, stopper mechanism, and so forth (all these means being not shown in the drawing).

On the upper part of the chain conveyor 22a which is situated to the side of the frying chamber 1B, there are provided carrying means 40 for taking the container P of the material to be fried as mounted on the topmost rack 31 out of the storage chamber 1A through a take-out port 39 on the upper part of the storage chamber, and forwarding means 50 for elevating the rack of the next level to the abovementioned take-out position.

The carrying means 40 in the illustrated embodiment is constructed, as shown in FIG. 2, with a swing arm 41 to be driven by a motor or other prime mover (not shown in the drawing), an opening-and-closing lid 43 fixed on one end of the swing arm 41 to open and close the abovementioned take-out port 39, which is heat-insulated with a heat-insulating material 42, and a pair of substantially L-shaped hooks 44 attached to the lid 43 for drawing out the food container through the take-out port 39. Each hook 44 is of such a construction, as shown in FIG. 7, wherein a long horizontal rod 44a and a short vertical rod 44c are integrally connected through a short ferrule 44b which is fitted at the extreme end of the horizontal rod 44a in a freely rotatable manner. The vertical rod 44c constantly hangs downward on its own dead weight. As soon as the opening and closing lid 43 is opened by rotation of the abovementioned swing arm 44, the vertical rod 44c becomes engaged with the container P held on the topmost rack 31, thereby being able to draw out the container P from the take-out port 39. Further, when the rack 31 is rotated by the turn table 21 to hit the vertical rod 44c, the vertical rod 44c together with the ferrule 44b rotates to avoid the rack with the horizontal rod 44a as the center of its rotation.

The abovementioned forwarding means 50, in the illustrated embodiment, is of such a construction that an operating rod 51 which advances and retracts in the up-and-down direction is provided on the upper part of the storage chamber 1A and inside the chain conveyor 22a which is positioned to the side of the frying chamber 1B, and a pair of push rods 53, 53 are attached to the bottom end of the operating rod 51 through a supporting member 52, as shown in FIG. 7. In the illustrated embodiment, the operating rod 51 is so constructed that it may be moved up and down by a rotating disc 54b provided on an output shaft 54a of a motor 54, through a swing lever 55 which oscillates with a link 54c and a pivotal point 55a as the center of its oscillation, whereby the push rods 53 move reciprocally between the solid line position and the double-dot-and-dash line positions in FIG. 7. By their descending motion, the push rods 53 push downward the edge 31a of the rack 31 at the topmost level inside the abovementioned chain conveyor 22a to thereby raise each rack 31 outside the chain conveyor a distance (pitch) h of the vertically adjacent racks, and to maintain its raised condition by means of the ratchet 37 and the engaging pawl 38.

Incidentally, each of the abovementioned push rods 53 is rotatably mounted on the supporting member 52 through a shaft pin 56, and, at the same time, is held abutted to a stopper 58. Thus, when the operating rod 51 rises and the push rod 53 hits the rack 31, the push rod 53 rotates in the clockwise direction to avoid the rack, as shown in FIG. 7.

Further, as shown in FIG. 2, there is provided, between the storage chamber 1A and the frying chamber 1B, transporting and feeding means 60 which receives and holds thereon a container P of the material to be fried which has been taken out of the storage chamber 1A by the carrying means 40, opens the lid of the packed container, and feeds the material to be fried into the frying chamber 1B.

Figure 10:
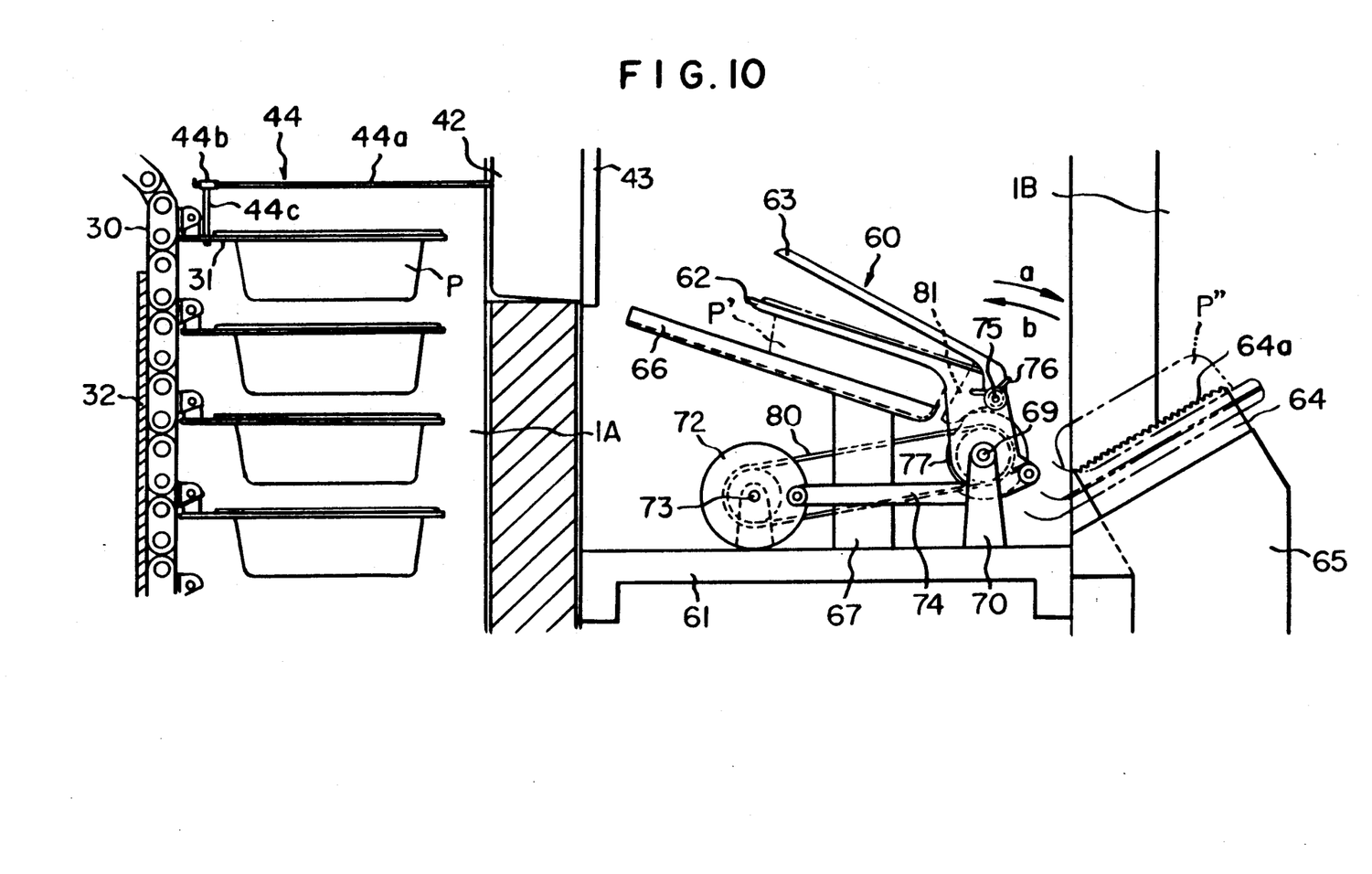
FIG. 10 is an enlarged front view of the transporting and feeding means of the food frying and vending system according to the present invention.
Figure 11:
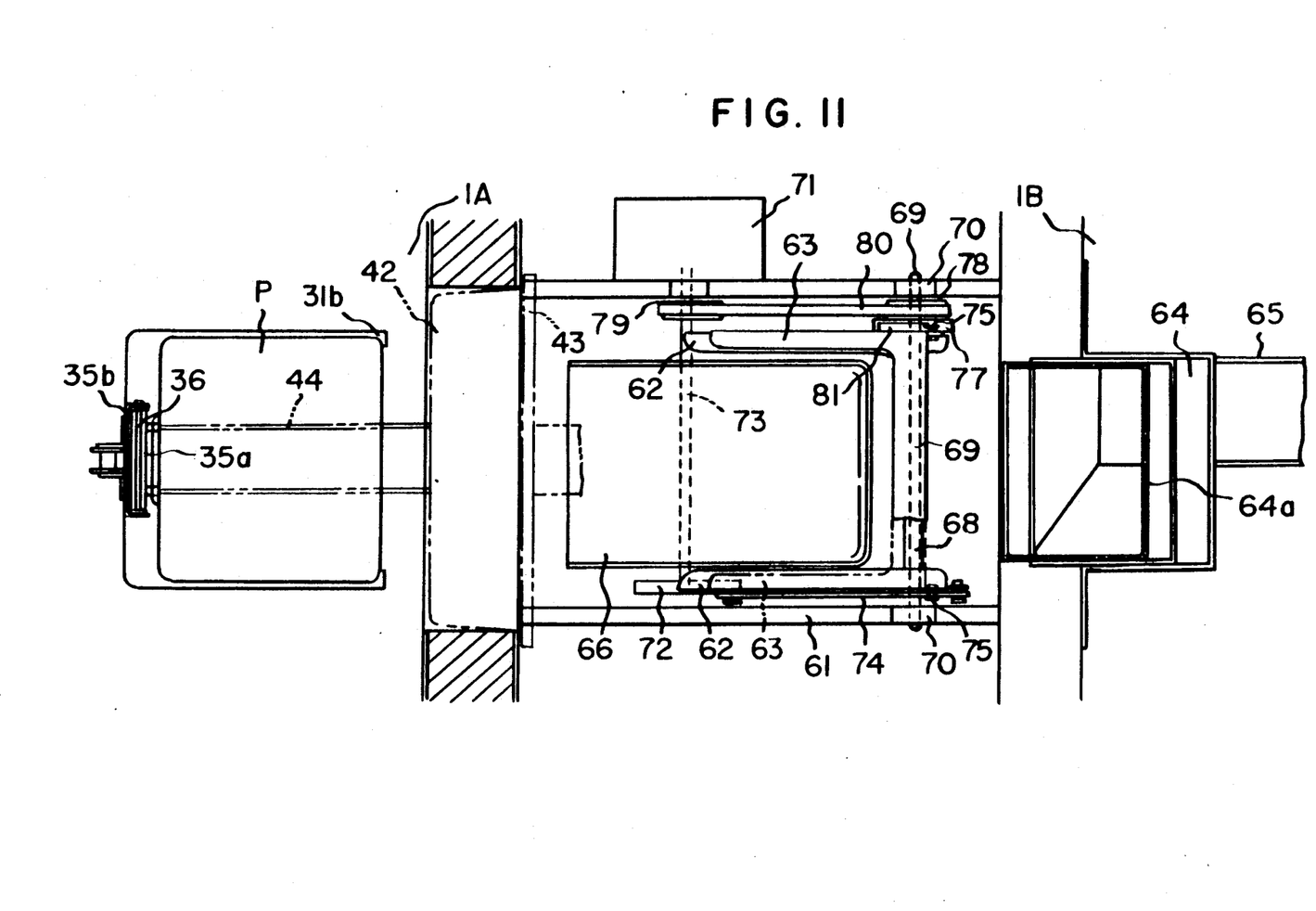
FIG. 11 is a plan view of the transporting and feeding means shown in FIG. 10.

The transporting and feeding means 60 of the illustrated embodiment is so constructed that, as shown in FIGS. 10 and 11, there are provided, on a supporting frame 61 mounted between the storage chamber 1A and the frying chamber 1B, rotational arms 62 which receive thereon the flanged part P1 of the container P taken out of the storage chamber 1A and invert the same; and clamps 63 which hold between the same and the the rotational arms 62 the flanged part P1 of the container P which has been transferred onto the arms, for the fixed holding. Thereafter, by opening the lid P2 of the container P by means of a cutter 64 when the container P is held inverted by both rotational arms 62 and clamps 63, the material to be fried F is discharged from container P onto an inclined chute 65 provided on the upper part of the frying chamber 1B to feed it into the frying chamber 1B. Numeral 66 refers to a guide plate for guiding the packed container P taken out of the storage chamber 1A to the abovementioned rotational arms 62, which is mounted on the supporting frame 61 through a supporting leg 67.

The rotational arms 62 are integrally provided on both ends of a cylindrical shaft 68, and are rotatable with a pivotal shaft 69 inserted into the cylindrical shaft 68 as the center of its rotation. The pivotal shaft 69 is, in turn, mounted on a supporting member 70 provided on the supporting frame 61. A reference numeral 71 designates a driving motor for the abovementioned rotational arms 62. A numeral 72 refers to a rotational disc provided on an extended output shaft 73 from the motor 71, the disc 72 and the rotational arms 62 being connected by a link 74, and the rotational arms 62 reciprocally rotate in the directions shown by arrows a and b in FIG. 10 by the rotation of the abovementioned disc 72. In the vicinity of the terminal point of the reciprocal movement, there is provided the abovementioned cutter 64.

As shown in FIG. 11, the clamp 63 is formed in a substantially angled U-shape, in plan, and is rotatably connected to the abovementioned rotational arms 62 by the axial pins 75. The clamp 63 is also rotationally energized constantly by a spring 76 in the direction to press-contact on the upper surface of the rotational arms 62, so as to hold the flanged part P1 of the container P between the arms 62 and the clamp 63. A reference numeral 77 designates a cam to cause the clamp 63 to rotate in the direction to be away from the rotational arms 62 against the abovementioned spring 76. The cam 77 per se is integrally connected with a gear 78 which is provided in a freely rotatable manner on the abovementioned pivotal shaft 69, and is rotationally driven at the same speed and in the same direction as the abovementioned extended output shaft 73 through a gear 79 mounted on this shaft 73 and a toothed belt 80. A reference numeral 81 denotes a cam follower for the cam 77, which is integrally provided with the clamp 63.

Figure 12A:
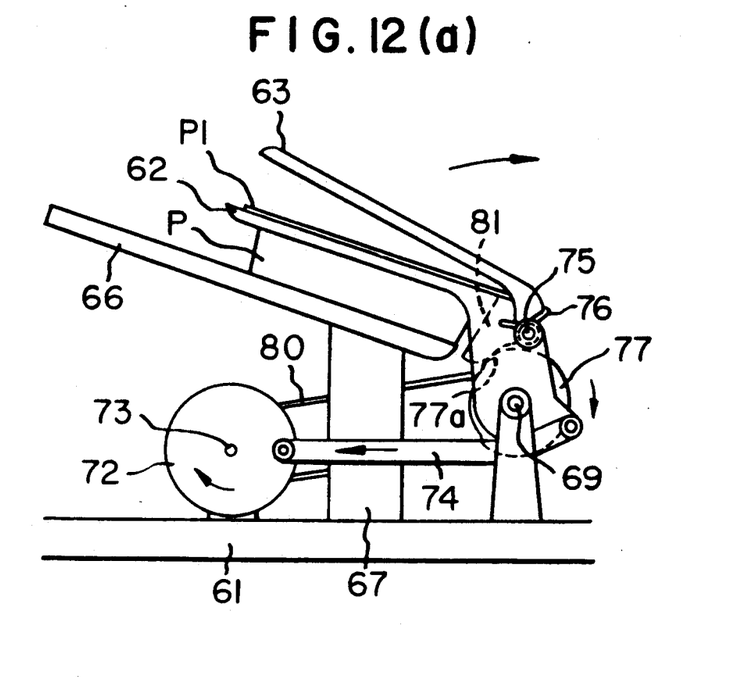
FIGS. 12(a) through 12(e) are respectively explanatory views for the operations of the rotational arms, the clamps and the cam in the transporting and feeding means shown in FIG. 10.
Figure 12B:
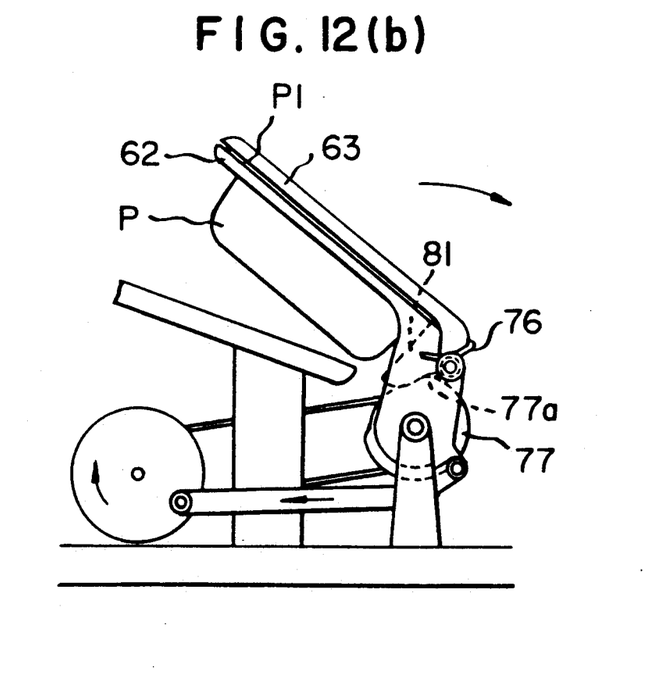
Figure 12C:
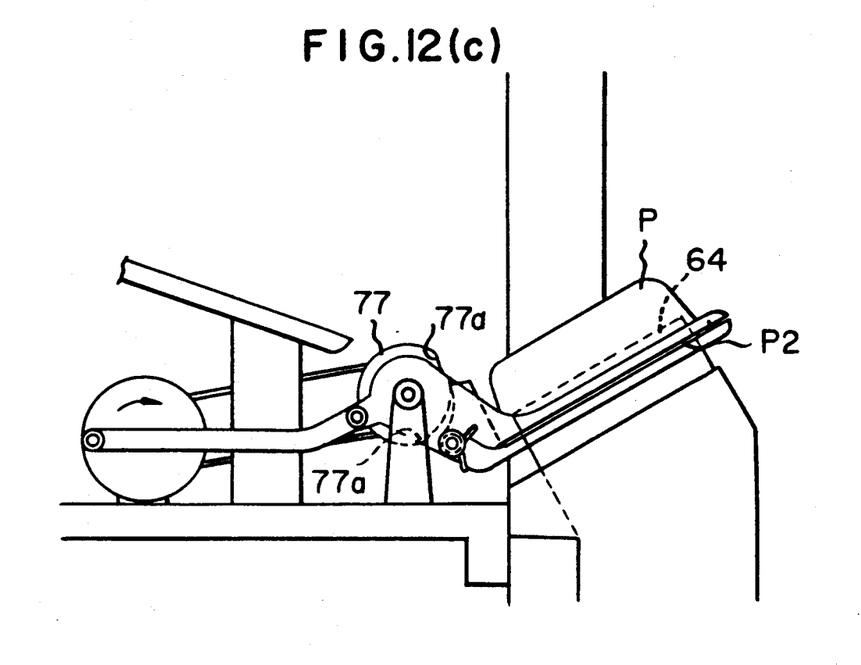
Figure 12D:
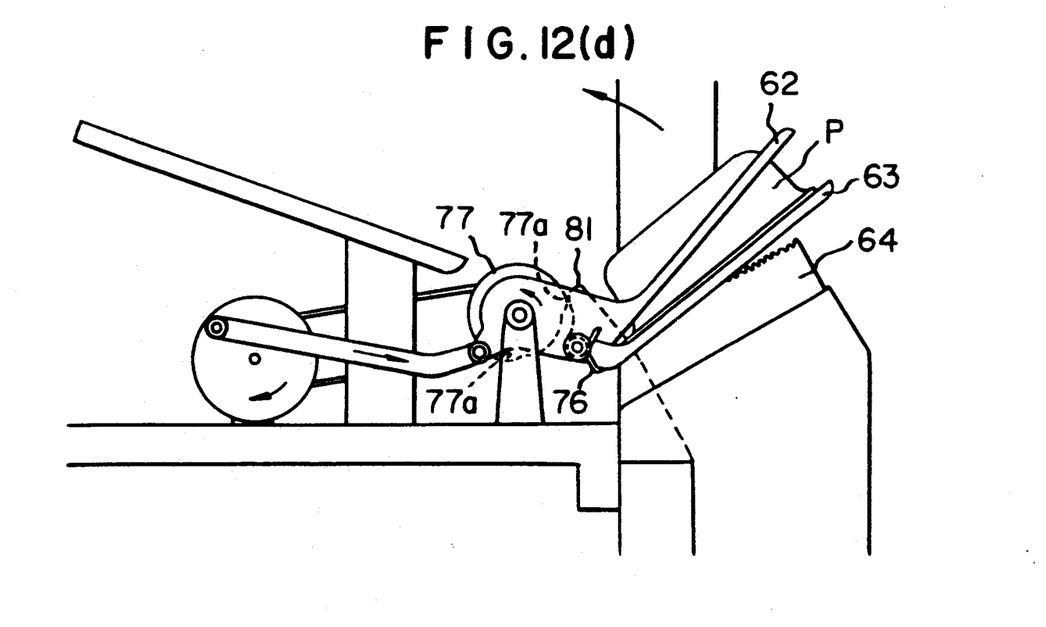
Figure 12E:
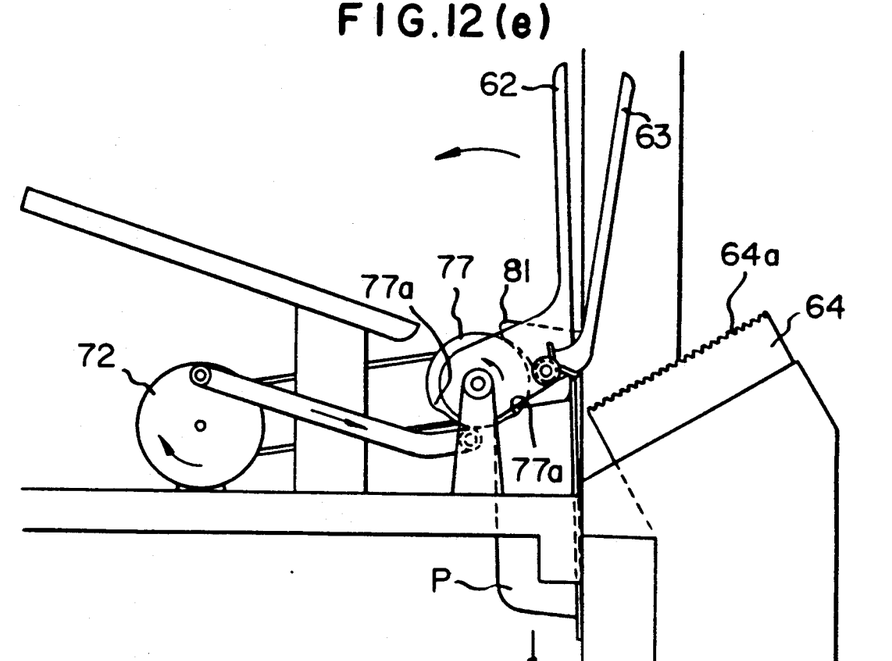

FIGS. 12(a) to 12(e) illustrate the operating sequence of the abovementioned rotational arms 62, the clamps 63 and the cam 77, wherein the rotational arms 62 always stop at a position shown by solid line in FIGS. 10 and 12(a), and the cam follower 81 is situated at a surface 77a of the operating height of the cam 77, whereby the clamps 63 are in a state of their being open with respect to the rotational arms 62 to be on stand-by for receiving the flanged part of the container. In that state, when the container P which has been taken out of the storage chamber 1A by the carrying means 40 is transferred onto the rotational arms 62 along the guide plate 66, the motor 71 operates to rotate the cam 77 at a constant speed in the clockwise direction, as shown in FIG. 12(a), and, at the same time, the arms 62 move forward in the clockwise direction at a speed slower than the cam 77, and the cam follower 81 becomes disengaged from the abovementioned high cam surface 77a at a position shown in FIG. 12(b), whereby the flanged part P1 of the container P is held between the rotational arms 62 and the clamps 63 by force of the spring 76. And, in that state, the rotational arms 62 and the clamps 63 rotate to the terminal position of their reciprocal motion, as shown in FIG. 12(c), where the lid P2 of the container P is opened by the cutter 64 and the contents of the container P are discharged onto the chute 65. Subsequently, the rotational arms 62 move backward in the counter-clockwise direction, as shown in FIG. 12(d), the cam 77 continuously rotates in the clockwise direction, the cam follower 81 comes to a position on the high cam surface 77a as shown in FIG. 12(d), the clamps 63 are separated from the rotational arms 62 against the spring 76 releasing flanged part P1, and finally, while the rotational arms 62 are rising in the substantially up-and-down direction, the empty container P drops downward, and both rotational arms 62 and the clamps 63 return to their initial position to be ready for the next operation, as shown in FIG. 12(a). In FIG. 2, the reference numeral 82 designates a collection box for the abovementioned used containers, and numeral 83 refers to a blower for creating the so-called "air curtain" at the opening part of the frying chamber 1B.

As shown in FIGS. 10 and 11, the cutter 64 is of such a construction that it is provided with saw-tooth portions 64a on and along the top edge thereof in a substantially angled U-shape, and is fixed with screws, etc. onto the top edge part of the abovementioned inclined chute 65 in a detachable manner. In this way, the lid P2 of the container P which has been inversely rotated together with the rotational arms 62 is cut-opened by the abovementioned cutter 64 in the angled U-shape at the inner position of the open recess of the container to cause the material in the container to drop onto the inclined chute 65 of its own weight.

Figure 13:
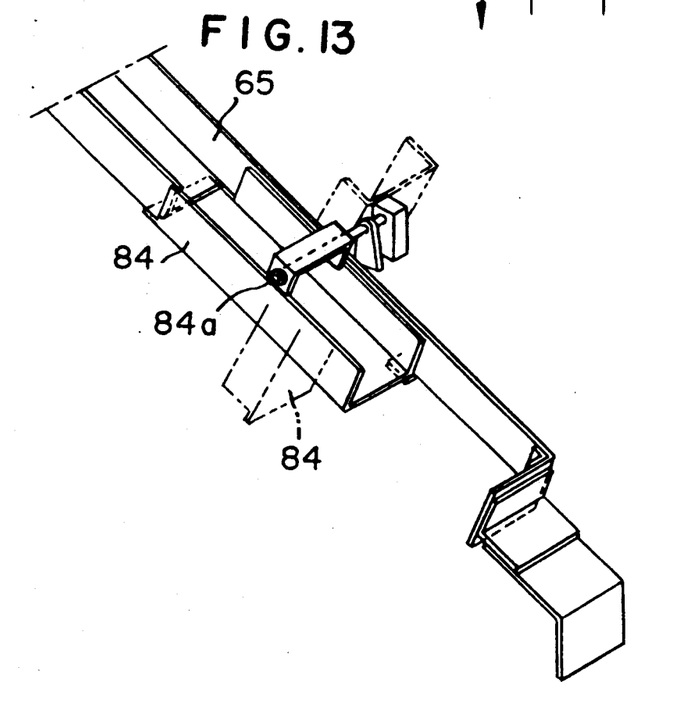
FIG. 13 is a perspective view of an inclined chute for feeding material which is to be fried into the frying machine.

As shown in FIGS. 2, 3 and 4, the inclined chute 65 is disposed with downward inclination in the upper center part of the frying chamber 1B. A flapper 84 is rotatably attached on a shaft 84a which acts as the center of activated by a motor, etc. (not shown in the drawing), as shown in FIG. 13.

Although the abovementioned chute 65 is shown schematically in the drawing, it is actually constructed with a multitude of thin rods of stainless steel, or like materials which extend in the longitudinal direction, and are shaped in the form of a trough. The flapper 84 is also made of the same rod material.

Below the flapper 84, there are disposed a pair of left and right baskets 85L, 85R used for frying, each of which is made of perforated plate, or the like. The material to be fried which has been discharged from the container is selectively fed by the flapper into either one of the baskets through the chute 65. That is to say, when material to be fried has been fed into one of the baskets 85L and the new frying is beginning, the material to be fried is fed into the other basket 85R. It should also be noted that these baskets 85L, 85R are provided in correspondence to the aforementioned left and right process step indicator lamps 12L, 12R, and the operating conditions are indicated on the process indicator lamps which correspond to the basket where the material to be fried has been supplied.

Below the abovementioned baskets 85L, 85R, there are disposed a cooking vessel 86 and an oil feeding vessel 87. Cooking oil is periodically supplied by circulation from the oil feeding vessel 87 into the cooking vessel 86 through circulating tubes 88a, 88b, and, at the same time, the cooking oil O stored in the cooking oil vessel 86 is maintained at a predetermined temperature (e.g., 180° C. or so) by a heater 89 provided beneath the cooking oil vessel 86.

In front of each of the abovementioned baskets 85L, 85R, there is stored a cartridge 90, in which a multitude of cups C are stacked. The cups C are placed one by one on a receiving stand 91 provided in the interior of mouths 13L, 13R for removing the abovementioned fried food.

Each of the abovementioned baskets 85L, 85R is rotationally driven independently of the other by a driving mechanism (not shown in the drawing) with a shaft 92 as its pivotal point, as shown by the solid line and the double-dot-and-dash line in FIG. 3. It is usually on stand-by at the solid line position in the drawing. In this construction, one of the baskets 85L or 85R, which has been selected before the food material to be fried is supplied from the chute 65, move to the double-dot-and-dash line position 85L' in FIG. 3 to receive the material to be fried from the chute 65. The material is fried in the cooking vessel 86 for a predetermined length of time, and, after draining the oil off the food material, the fried food is discharged into the cup C through a guide chute 93 by inverse rotation of the basket 85L over to the cup C as shown by the double-dot-and-dash line 85L" in FIG. 3.

In FIG. 3, a reference numeral 94 designates a cleaning filter for removing refuse from the frying which has been mixed into the cooking vessel 86 at the time of circulating the cooking oil O between the cooking vessel 86 and the oil feeding vessel 87. Reference numerals 95, 96 respectively denote an oil discharging pipe and an oil feeding pipe for periodically exchanging the cooking oil in the oil feeding vessel 87 with fresh oil. A numeral 97 refers to a discharged oil reservoir. A numeral 98 refers to a fresh oil feeding tank. A reference numeral 99 represents a ventilating device incorporated therein with a deodorant filter. A numeral 100 refers to an automatic control section.

In the above-described construction of the automatic food frying and vending system according to the present invention, when a customer inserts coin or bank note of a predetermined amount into the coin slot 6 or the bank note slot 7 shown in FIG. 1, and pushes any one of the selection buttons 4a, 4b, 4c and 4d to select the item to be fried, the stocker 20 in the storage chamber 1A rotates until the chain conveyor (e.g., 22a) which accommodates the containers P of the selected material to be fried arrives at the side facing the frying chamber 1B, as shown in FIGS. 3 and 4, where the unit stops.

Subsequently, the oscillating arm 41 of the carrying means 40 rotates in the counter-clockwise direction as shown in FIG. 2, and the opening and closing lid 43 of the take-out port 39 is opened. Simultaneously with this, the topmost container P on the chain conveyor 22a is carried outside of the storage chamber 1A from the take-out port by means of the hook 44, guided to the guide plate 66 of the transporting and feeding means 60, and placed at its flanged part on the rotational arms 62. Then, the oscillating arm 41 returns to the solid line position in FIG. 2 to close take-out port 39 with the opening and closing lid 43, and, at the same time, the operating lever 51 of the forwarding means 50 comes down, whereby the topmost rack 31 inside the conveyor is pushed downward by the push rod 53, the container P at the next level outside the conveyor is brought to the topmost position, and the operating lever 51 returns upwardly to its initial position.

On the other hand, the rotational arms 62, on which the container P is placed, inversely rotates by the action of the motor 71 while holding the flanged part of the container with the clamps 63. In its inversely rotated position, the lid P2 of the container P is opened by the cutter 64, and the material to be fried is discharged from the container P and fed into the inclined chute 65. Subsequently, when the rotational arms 62 return to their initial position, the clamps 63 are opened to discharge the used container P into the collection box 82, after which the rotational arms 62 return to their initial position to be ready for the next operation.

The material to be fried as supplied into the inclined chute 65 is then guided into either of the baskets 85L or 85R by means of the flapper 84 to be fried in the cooking oil O in the cooking vessel 86, and, after drainage of the oil as previously mentioned, the fried food is chuted into the cup C. Thereafter, the basket 85L returns to the solid line position in FIG. 3 to terminate the frying work.

During the abovementioned series of operation, temperature for preserving the materials to be fried, temperature for heating the cooking oil, and so forth are all controlled automatically by the control section 100. Also, the steps of operations of the system are sequentially indicated on the indicator lamp 12L or 12R of the process step indicating section 12 provided on the front door of the console.

As soon as the frying work is completed, the customer is able to take out the cup C containing therein the fried food by opening the outlet port 13L or 13R for taking out the fried food, which corresponds to the indicator lamp 12L or 12R. During the frying, the outlet ports 13L and 13R are locked by an electromagnetic plunger.

Although not shown in the drawing, a fire extinguisher is provided in the vicinity of the abovementioned cooking vessel 86, which is automatically actuated when the temperature in the component members in the frying chamber above the cooking vessel reaches a predetermined temperature (for example, 95° C. or above), and, at the same time, causes the warning lamp 11 provided on the upper part of the front door of the main body (console) of the system to light up.

As has been described in the foregoing, the automatic food frying and vending system according to the present invention is constructed so that a storage chamber for storing the food material to be fried in their frozen state and a frying chamber for frying the material in cooking oil are installed in the main body of the automatic food frying and vending system in discrete sections designated for their respective purposes. A stocker for receiving and keeping a large number of packed containers, each having a lid or cover, is provided in the abovementioned storage chamber; a carrying means for taking out, one by one, from the storage chamber each container of the food material to be fried which has so far been housed in the stocker is provided. Finally there is provided transporting and feeding means for receiving the container of the food material to be fried, from the storage chamber by the carrying means, for opening the sealed cover of the container, and for forwarding the food material to be fried into the frying chamber. It becomes possible by use of this invention to automatically implement all the process steps of preserving the materials to be fried, preparing the fried food, vending the thus prepared fried food, hence there can be effectively realized the automatic food frying and vending system which is easy to handle and convenient in its handling.

Although, in the foregoing, the present invention has been described in specific details with reference to a particular embodiment thereof, it should be understood that the invention is not limited to this embodiment alone, but changes and modifications may be made by those persons skilled in the art to the construction and arrangement of these constituent members, without departing from the spirit and scope of the invention as recited in the appended claims.

I claim:

1. An automatic food frying and vending system, comprising:
   a main housing which includes a storage chamber for preserving frozen food material and a frying chamber for cooking said food material;
   a stocker unit disposed in said storage chamber for receiving and holding said frozen food material in a plurality of sealed containers;
   carrying means for selectively removing said sealed containers one at a time from said stocker unit; and
   transporting and feeding means for receiving said sealed container from said carrying means, said transporting and feeding means having means for opening said sealed container and transporting said frozen food material from said container into said frying chamber.

2. An automatic food frying and vending system as claimed in claim 1, wherein said stocker unit comprises a plurality of chain conveyors for moving selected sealed containers toward said carrying means, said plurality of chain conveyors being mounted on a turntable whereby a selected chain conveyor can be rotated toward said carrying means.

3. An automatic food frying and vending system as claimed in claim 2, wherein each chain conveyor carries thereon one type of frozen food material in sealed containers.

4. An automatic food frying and vending system as claimed in claim 2 wherein said plurality of chain conveyors each comprises a plurality of U-shaped racks for receiving said sealed containers of frozen food material, said plurality of racks being mounted on an endless type chain disposed in a vertical direction.

5. An automatic food frying and vending system as claimed in claim 4 wherein each rack is pivotally attached to said chain conveyor so as to be oriented substantially horizontally when moving vertically in a first direction and so as to be oriented substantially vertically when moving vertically in a second and opposite direction.

6. An automatic food frying and vending system as claimed in claim 1 wherein said carrying means comprises an oscillating arm provided in said storage chamber, a lid portion on one end of said oscillating arm for opening and closing a take-out port of said storage chamber, and a pair of substantially L-shaped hooks for attaching to said sealed container, said hooks being attached to and extending inwardly of said storage chamber from said lid portion when said take-out port is closed.

7. An automatic food frying and vending system as claimed in claim 1 wherein said transporting and feeding means includes rotational arms for receiving said sealed container from said carrying means, said rotational arms being capable of rotating said container to an inverse position, clamping arms for holding a sealed container against said rotational arms during rotation, and cutter means for opening said sealed container while said sealed container is in the inverse position thereby allowing said frozen food material to be discharged from the container under the force of gravity into said frying chamber.

8. An automatic food frying and vending system as claimed in claim 1 wherein said frying chamber includes an inclined chute for transferring said frozen food material into said frying chamber, a flapper element rotatably attached to said inclined chute for guiding and distributing said frozen food material, at least one basket provided below said inclined chute for receiving said frozen food material, and a cooking vessel for receiving said basket and frozen food material for cooking.

9. An automatic food frying and vending system as claimed in claim 8 wherein a plurality of baskets are provided and said frozen food material is transported and guided to selected ones of said baskets by said flapper element.

* * * * *